United States Patent [19]
Ziegler

[11] Patent Number: 4,902,418
[45] Date of Patent: Feb. 20, 1990

[54] ELEMENT HAVING A POROUS WALL

[75] Inventor: Heinrich Ziegler, Rutschwil, Switzerland

[73] Assignee: Sulzer Brothers Limited, Winterthur, Switzerland

[21] Appl. No.: 927,849

[22] Filed: Nov. 6, 1986

[30] Foreign Application Priority Data

Nov. 22, 1985 [CH] Switzerland ............ 4993/85

[51] Int. Cl.$^4$ ............ B01D 13/00; B01D 25/02
[52] U.S. Cl. ............ 210/321.77; 210/321.86; 210/346; 210/433.1; 210/487; 210/489; 210/493.3; 210/493.5; 210/500.41; 55/158; 55/521; 261/122; 366/337; 366/338; 366/339; 422/48; 422/143
[58] Field of Search ............ 210/512.1, 317, 335, 210/336, 337, 338, 340, 346, 321.86, 321.77, 446, 456, 461, 486, 487, 489, 493.3, 493.5, 495, 500.41, 433.1; 366/336, 337, 338, 339, 340; 137/549, 550, 808, 810, 811; 55/158, 521; 422/143, 144, 48

[56] References Cited

U.S. PATENT DOCUMENTS

| | | | |
|---|---|---|---|
| 3,051,462 | 8/1962 | Novel | 366/337 |
| 3,190,618 | 6/1965 | Katzen | 366/337 |
| 3,491,021 | 1/1970 | Huntington | 210/338 |
| 3,616,928 | 11/1971 | Rosenblatt | 55/158 |
| 3,620,895 | 11/1971 | Bailey et al. | 210/493.5 |
| 3,774,771 | 11/1973 | Manjikian et al. | 210/456 |
| 3,918,688 | 11/1975 | Huber et al. | 366/336 |
| 4,043,539 | 8/1977 | Gilmer et al. | 366/340 |
| 4,206,050 | 6/1980 | Walch et al. | 210/500.41 |
| 4,246,120 | 1/1981 | Baudet et al. | 210/321.79 |
| 4,261,834 | 4/1981 | deWinter | 210/500.41 |
| 4,328,102 | 5/1982 | Bellhouse et al. | 210/456 |
| 4,408,892 | 10/1983 | Combes et al. | 366/337 |
| 4,451,370 | 5/1984 | Murai et al. | 210/321.77 |
| 4,606,867 | 8/1986 | Eguchi | 261/122 |
| 4,636,310 | 1/1987 | Bellhouse | 210/456 |

FOREIGN PATENT DOCUMENTS 2011796 7/1979 United Kingdom.
8102683 10/1981 World Int. Prop. O. ......... 210/456

OTHER PUBLICATIONS

Landé et al., "Methods for Increasing the Efficiency of a New Dialyzer-Membrane Oxygenator", vol. XIV Trans. Amer. Soc. Artif. Int. Organs, 1968, pp. 227–231.

Primary Examiner—W. Gary Jones
Attorney, Agent, or Firm—Kenyon & Kenyon

[57] ABSTRACT

The element is disposed in a vessel receiving a fluid flow. The vessel wall is porous at least for a proportion of the fluid and bounds an inner chamber communicating through the vessel wall with a chamber outside the vessel. The element is in the shape of a plate or tube and is so devised that the porous wall either on its own or in combination with other similarly shaped elements to form a module, forms a turbulence generator particularly in the form of a static mixer for the fluid flow. The resulting turbulence on the wall of the elements ensures that the wall remains porous.

20 Claims, 2 Drawing Sheets

ELEMENT HAVING A POROUS WALL

This invention relates to an element having a porous wall. More particularly, this invention relates to a filtration element.

As is known, various types of elements have been provided for the filtration of various fluids. For example, British Pat. No. 2,011,796 describes a filter element which is disposed within a vessel so as to filter a fluid flow. In this case, the filter element is formed as a tubular structure with a porous wall through which a filtrate may pass into an internal chamber for subsequent removal from the vessel.

One problem which always arises in the filtration of any media or fluid is to give each individual part of the medium a chance to expose the filtrate to the filter collecting chamber. That is, the filter is more efficient as the filter is better able to filter out all the filterable proportion from a given fluid flow. However, achieving this state becomes difficult in practical filtration. Specifically, boundary layers form inside the vessel on the walls which bound the filtrate collecting chambers and the rate of flow or the passage of the filtrate in the boundary layers decreases so that only a small proportion of the through-flowing fluid contacts the actual porous wall. Further, the removal of the filtrate often causes an increase in the viscosity of the fluid to be filtered. This, in turn, adds to or, at least, preserves the boundary layers.

Heretofore, various attempts have been made to provide an additional exchange of those zones of the through-flowing fluid which are near the porous walls, for example, by positioning a series of wire screens in those zones so as to increase the turbulence of the fluid flowing over the porous wall. In some cases, the filter surface has been moved relative to the fluid flow. Unfortunately, at flow speeds which provide satisfactory take-up of the filterable proportion, actions of these kind either consume substantial energy or are of limited effect and also expensive. These difficulties also occur with various eddy-producing devices on the porous walls as well as with the variously known agitators or scraper vanes which have been operative along the filtration surfaces of a filter or with devices known generically as static mixers.

By way of example, guide or deflecting surfaces have sometimes been provided in the flow to a filtration surface in order to produce a braided or plaited flow after such a surface. In addition, the filter surface can also be moved across the flow direction of the treatment material. In many cases, the flow speeds are in the laminar range. However, it must be possible for the proportion of that flow which is to be removed by filtration to be in contact with the filter surface for a sufficiently long time. Braided flows, on the one hand, decay rapidly and have little effect so far as the subsequent filter surfaces are concerned. Further, moving filter surfaces are effective but are technologically very elaborate.

The range of problems noted above also becomes increasingly difficult as the filter pore size decreases.

Where turbulence generators have been used to produce eddy currents in the flow issuing from them, such eddy currents, in the light of the Reynolds numbers normal in such systems, are sometimes the characteristic dimensions of the turbulence generator. They therefore have only a very limited effect as far as filter surfaces are concerned.

Accordingly, it is an object of the invention to increase the contact time of the filtrate of a fluid flow with a filter surface.

It is another object of the invention to remove residues building up on a porous filter surface during operation in a relatively efficient manner.

It is another object of the invention to prevent the build-up of residues on a porous filter surface for a fluid flow.

It is another object of the invention to even out differences in concentration in a fluid being filtered.

It is another object of the invention to be able to filter a fluid flow at reduced flow losses and technological outlay.

It is another object of the invention to provide a filter structure which can be used in processes requiring small to very small pore sizes in the material to be filtered.

Briefly, the invention provides an element for positioning in a fluid flow which has an inner chamber and a porous wall bounding the chamber, at least in part. In addition, the element is of a shape to define a turbulence generator for generating turbulence particularly in the form of a static mixer in a fluid flow passing thereover.

The element may be constructed with a plate-like cross-section, for example in the form of a lamella, or may have a tubular cross-section.

The shape of the element may be similar to the shape of a static mixer element and may be combined with like elements in a static mixer array.

A filter employing the element may be constructed with a vessel for a fluid flow wherein a wall of the vessel separates the fluid flow from the exterior of the vessel. In this case, at least one of the elements is disposed in the vessel so as to generate turbulence in the fluid flow while at the same time filtering a filtrate from the fluid flow through the porous wall into the inner chamber of the element for subsequent outlet through the wall of the vessel to the exterior. Alternatively, the element may be used to introduce a fluid such as a gas into the fluid flow.

The construction of the filter element is such that the element provides guide or deflecting surfaces in a constructionally unitary manner. Thus, braided flows which issue from the deflecting surfaces are operative for the filter surface even as they arise. Consequently, higher shearing stresses on the filter surfaces are available than in previously known systems which are disposed after or before a filter element. Further, the filter surface remains open and the pores are not restricted by any deposits. Thus, a thorough mixing of the fluid flow is combined with the exposure of the filter surface to the various proportions of the fluid flow.

The filter element may be formed in a corrugated manner so that wave like surfaces are provided to the fluid flow in order to increase turbulence in the fluid flow. Because of the geometry of the element, a continuous reorientation and intensive mixing of a passing fluid flow occurs in such a manner that the boundary layers of the fluid near the surfaces of the element are renewed and replaced by components which tend to move towards the center of the fluid flow. Thus, a so called plug flow arises.

These and other objects and advantages of the invention will become more apparent from the following description taken in conjunction with the accompanying drawings wherein.

Figure 1:
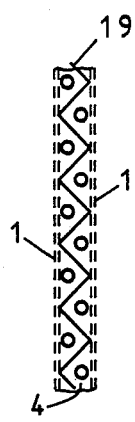
FIG. 1 illustrates a cross-sectional view through an element constructed in accordance with the invention.
Figure 7:
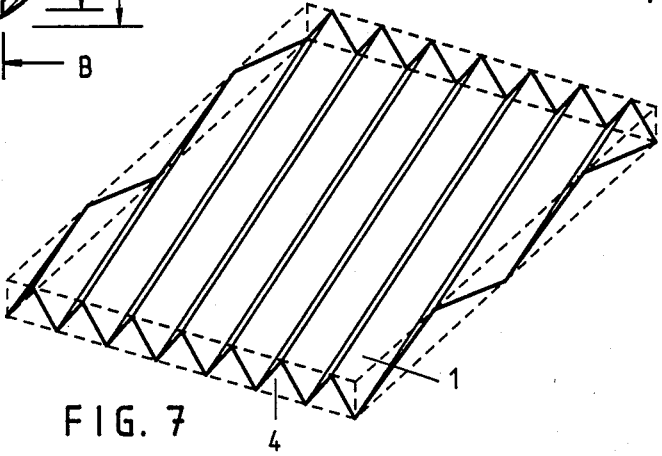
FIG. 7 illustrates a corrugated element constructed in accordance with the invention.
Figure 13A:
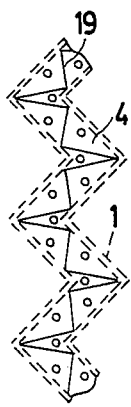
FIG. 13a illustrates a view taken on line C—C of FIG. 13.

Referring to FIG. 1, the element is formed of a pair of porous walls 1 each of which is carried by a support mesh or lattice 19 which defines a closed inner chamber 4. As indicated, the porous walls 1 form the boundary of the inner chamber 4 and are in parallel relation to each other. This element has a plate-like cross-section and is shaped, for example as indicated in FIG. 7, to define a corrugated or wavy shape which functions as a turbulence generator 8 for generating turbulence in a fluid flow passing thereover.

Each porous wall 1 of the element is of a porosity to permit a proportion, i.e. a filtrate of the fluid flow to pass through into the inner chamber 4.

Figure 2:
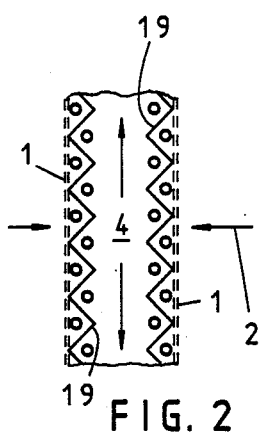
FIG. 2 illustrates a cross-sectional view of an element having a plate or a tubular cross-section in accordance with the invention.

Referring to FIG. 2, the element may be constructed with a pair of porous walls 1, each of which is mounted on a separate support mesh 19 with the inner chamber 4 disposed between the two meshes. As indicated, each support mesh 19 has a structure which is inherently pervious. In this regard, the meshes 19 have average apertures which are at least three times as large as those of the pores of the walls 1 in order to enable fluid to flow through the walls 1 and into the inner chamber 4.

Of note, the element may be of tubular cross-section wherein the porous wall 1 is tubular and is mounted on a mesh 19 of tubular shape.

Figure 3:
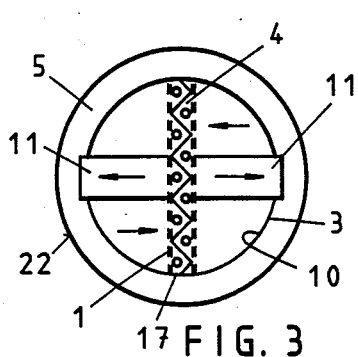
FIG. 3 illustrates a cross-sectional view of a filter structure employing a vessel and an element in accordance with the invention.
Figure 5:
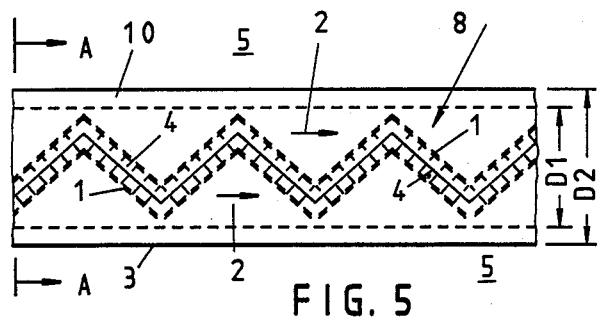
FIG. 5 illustrates a plan view of a vessel having a corrugated filter element in accordance with the invention.

Referring to FIG. 3, an element constructed with a cross-section as indicated in FIG. 1 and corrugated in a manner similar to that shown in FIG. 7, is placed in a vessel 3 having an internal wall 10 to define a path for a fluid flow, as indicated by the arrows 2. As indicated in FIG. 3, the element is disposed on a diametric plane of the vessel 3 while being shaped to conform to the cylindrical interior surface of the vessel 3 along the length of a vessel 3 as indicated in FIG. 5. The element itself forms a turbulence generator for the fluid flow 2 so as to generate turbulence within the flow.

As indicated FIG. 3, the vessel 3 may be disposed in a second tube 22 in spaced concentric relation so that a chamber 5 is disposed between the vessel 3 and tube 22. Further, a plurality of tubes 11 are connected between an opening in the filter element and an opening in the wall 10 of the vessel 3 in order to communicate the inner chamber 4 of the filter element with the chamber 5 exterior to the vessel 3. In this way, filtrate which passes through the porous walls 1 of the filter element is able to pass through the tubes 11 into the chamber 5 for subsequent processing or recycling, as is known.

Figure 6:
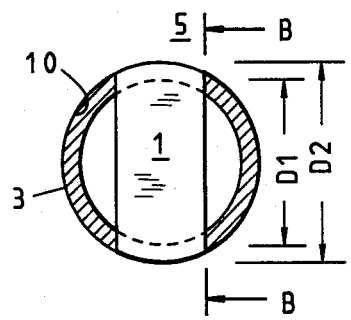
FIG. 6 illustrates a view taken on line A—A of FIG. 5.

Referring to FIG. 6, in an alternative construction, the filter element may extend through the vessel 3 may have a solid wall with an inside diameter D1 and an outside diameter D2 and the wall 10 of the tubular vessel 3 so as to communicate the inner chamber 4 of the element directly with the chamber 5 exterior to the vessel wall 10.

If the element is to be used as a filter element, the walls 1 are porous only with respect to the component fluid flow 2 in the vessel 3 which is to flow through the wall 1 as a filtrate into the inner chamber 4 for a subsequent flow into the exterior chamber 5.

If the element is used to carry some other fluid, for example, a gas or a nutrient solution, the wall 1 may have a porosity relative to the fluid so as to mix this second fluid into the fluid flow 2. In this case, the element is a mixing element and the gas or nutrient solution would flow from the exterior chamber 5 into the inner chamber 4 and thereafter through the porous walls 1 in order to be mixed into the fluid flow 2 in the vessel 3. In the case of the embodiment illustrated in FIG. 3, the gas or nutrient solution would flow from the exterior chamber 5 through the tubes 11 and into the inner chamber 4 or as in the embodiment of FIG. 6, the gas or nutrient solution would flow directly from the exterior chamber 5 into the inner chamber of the element.

Each porous wall 1 may consist of at least one layer of a material of a porosity or of a pore size to impart a porosity for use in a microfiltration to ultrafiltration range i.e. in a micron, sub-micron or molecular range. In such a case, the layer may be a semi-permeable layer in the form of a diaphragm. Further, the layer of material may be a layer of polysulphone applied to or impregnated into a laminated sintered support mesh or lattice 19.

In another embodiment, the element may be made with a single porous wall 1 and a non-porous wall with the inner chamber 4 bounded by the two walls.

Figure 4:
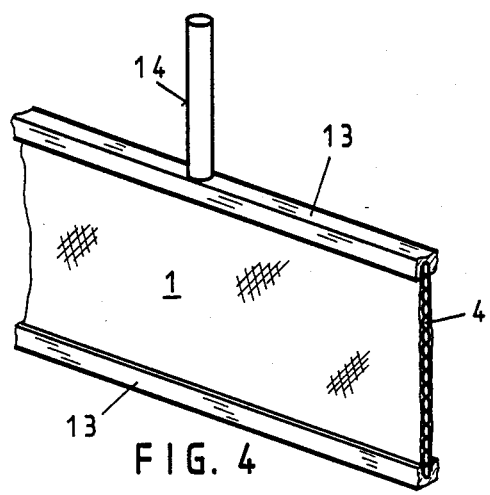
FIG. 4 illustrates a part perspective view of a further embodiment of an element in accordance with the invention.

Referring to FIG. 4, the filter element may be held in a frame 13 which extends in seal-tight relation about the inner chamber 4 while a connecting pipe 14 extends through the frame 13 to communicate the inner chamber 4 with an external chamber.

Figures 8, 9:
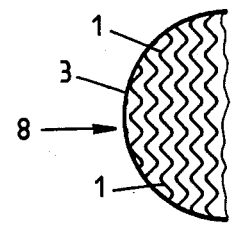
FIG. 8 illustrates a cross-sectional view of a vessel containing a plurality of elements constructed in accordance with the invention.
FIG. 9 illustrates a cross-sectional view of a different cross-section of the vessel in FIG. 8.

Referring to FIGS. 8 and 9, a plurality of corrugated elements may be stacked together in parallel relation so as to define a plurality of filter chambers for a fluid flow within a vessel 3. In this case, one group of corrugated elements may be disposed in parallel while a second group of like elements is coaxially and angularly disposed, for example at 90°, to the first group as indicated in FIG. 9.

Figure 10:
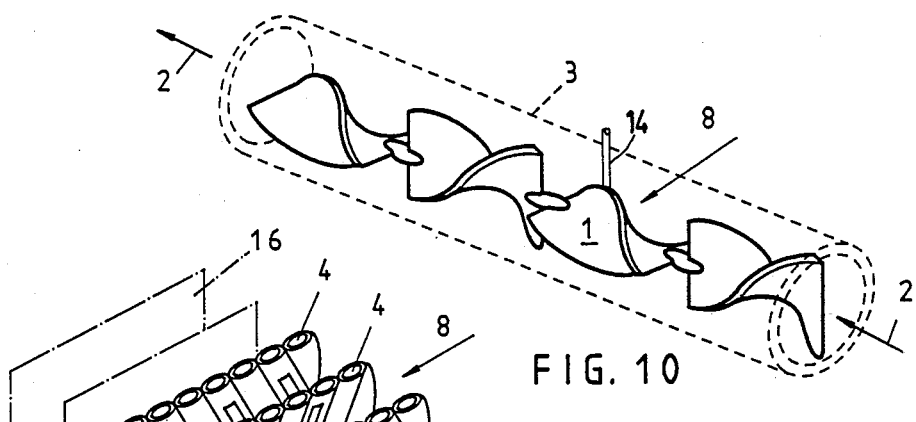
FIG. 10 illustrates a diagrammatic perspective view of an element shaped to form a helical static mixer fitted within a vessel in accordance with the invention.
Figure 11:
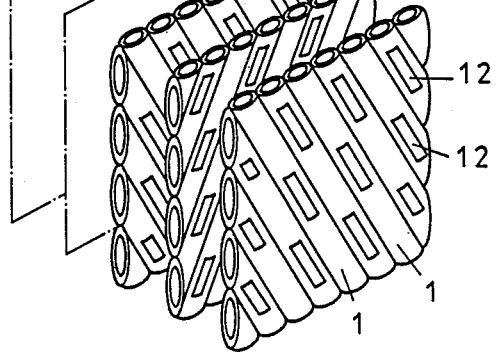
FIG. 11 illustrates a diagrammatic view of two-shaped elements combined to form a static mixer in accordance with the invention.
Figure 12:
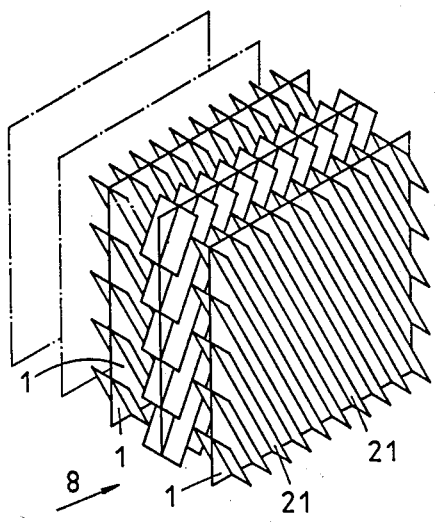
FIG. 12 illustrates a diagrammatic view of plate-like elements combined to form a static mixer in accordance with the invention.
Figure 13:
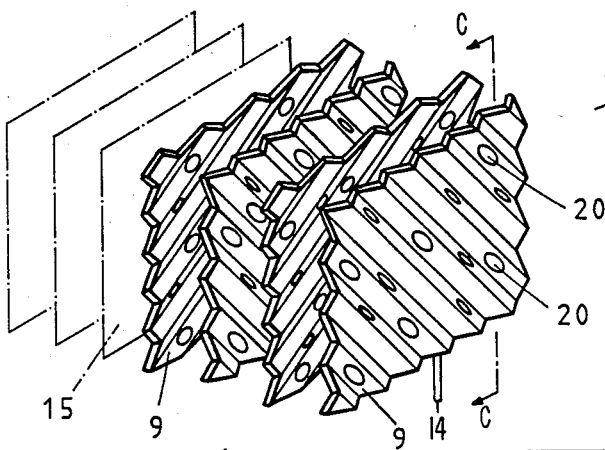
FIG. 13 illustrates a diagrammatic view of corrugated elements combined to form a static mixer in accordance with the invention.

A plurality of a filter elements may be combined to form a module to provide a turbulence generator which functions as a static mixer 8. For example, as indicated in FIG. 10, a series of elements, each of which is of helical shape, may be disposed within a tubular vessel 3 in a coaxial manner. Alternatively, as shown in FIG. 11, each filter element may be formed as a tube with a plurality of tubes contiguous to each other to form a layer 16 as illustrated. In this case, the tubes in the adjacent layers 16 are disposed to cross one another. Further, the individual tubes may be provided with openings 12 in the form of slots which pass through the tubes in sealed relation to the inner chambers so that the fluid flow may pass directly through the filter elements. As indicated in FIG. 12, each filter element is in the form of a plate with the walls of each plate having turbulence producing vanes 21 thereon which act as guide surfaces for guiding the fluid flow therebetween. Further, the vanes 21 of adjacent layers cross each other in a transverse manner. As indicated in FIG. 13, each filter element layer 15 is corrugated with the corrugations 9 of each layer disposed in criss-crossing relation to the corrugations 9 of an adjacent layer 15. Further, openings 20 in the form of circular openings are provided as FIG. 11. In this case, the corrugations 9 of the respective layers 15 define turbulence producing surfaces.

The arrangements of the filter elements in the static mixer arrangements in FIGS. 11, 12 and 13 cause repeated deflections of the fluid flow passing over and through the filter elements. This, in turn, produces eddy currents which continuously bring more layers near the porous walls, so that each portion of the fluid flow has the chance of contacting the porous wall for a sufficiently long period of time to permit filtrate to pass through.

One interesting use of the filter elements is in fluidized reactor technology. In reactors of this kind, particularly in difficult technical areas such as technologies for the culture of living cells, turbulence generators are used to maintain a culture bed in a continuous state of thorough mixing and to make sure that there is no uncontrollable eddying in the bed and that there is no repeated mixing together of elements previously separated from one another. The above described filter elements which inherently form turbulence generators may be used to carry a fluid from an exterior chamber in order to gas the fluidized bed. If the porous wall is appropriately structured, i.e., is provided with an appropriate porous diaphragm, in situ gassing without bubbling can be provided in a reactor of this kind.

Figure 14:
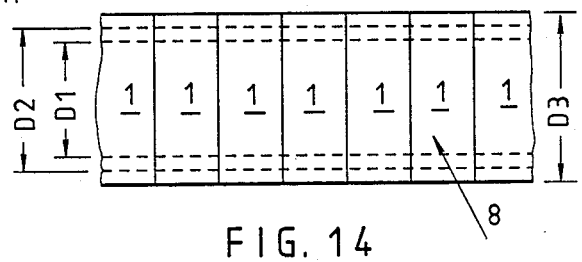
FIG. 14 illustrates a view taken on line B—B of FIG. 6.

Referring to FIG. 14, one method of making a filter element such as illustrated in FIG. 6 may be as follows:

First, the plate-like element is corrugated and then introduced into a rotatable sleeve of a greater diameter D3 than the diameter of a subsequently finished vessel D2; the introduction of the corrugated element being such that the inner chamber is radially disposed. Next, the sleeve is rotated while a hardenable plastic is poured into the sleeve in order to form a hardened peripheral tube having an inside diameter D1 with the element secured therein at opposite radial ends. After curing or hardening is complete, the resulting sleeve with the embedded element is then withdrawn from the sleeve. An outer layer of the fabricated tube is then removed by grinding or turning so that the inner chamber of the filter element is exposed at opposite radial ends. In this respect, the tube is ground or turned down to a diameter D2 as indicated in FIG. 14. This diameter also corresponds to the diameter illustrated in FIG. 6. Once machined to this state, a unit arises in which the inner chamber of the element is open to the outside of the tube (vessel 3 in FIG. 6). This unit can then be inserted into a second tube having an inner diameter which can be as large as the diameter D3 indicated in FIG. 14.

The above method may be used with minor modification in order to produce a filter element as indicated in FIG. 3. However, in this case, the inner chamber 4 must be sealed off against the fluid flow 2 at the places 17 of the wall 10 of the vessel 3.

The invention thus provides a filter element which has a dual characteristic of being capable of filtering a fluid flow while also creating turbulence in the fluid flow. The construction of the filter element is such that a continuous stimulation or turbulence is imparted to a fluid flow flowing over the element. In this way, boundary layers are disturbed during fluid flow in a relatively simple economical manner without the need for additional components.

Further, the shape of the filter element creates turbulence throughout the length of the element without decay of turbulence.

The element may be used within a vessel to filter a filtrate from a fluid flow passing through the vessel or to admix fluid or gas from outside the vessel into the fluid flow. Further, a plurality of elements may be combined into a module, particularly in the form of a static mixer for use in the flow path of the fluid of the vessel.

What is claimed is:

1. In combination,
   a vessel defining a flow path for conducting a fluid flow therethrough, said vessel having a wall for separating the fluid flow from the exterior of said vessel; and
   at least one element of plate-like cross-section disposed in and longitudinally of said vessel and shaped to define a corrugated shape across said flow path for generating turbulence in the fluid flow within said vessel, said element having an inner chamber of constant width communicating with said exterior of said vessel through said vessel wall, a semi-permeable wall bounding said inner chamber at least in part and being permeable for a proportion of the fluid flow in said vessel for use in a micron, submicron or molecular range and a support mesh supporting said semi-permeable wall thereon.

2. The combination as set forth in claim 1 wherein said semi-permeable wall has a porosity relative to the fluid flow in said vessel to filter a proportion thereof into said inner chamber for passage to said vessel exterior.

3. The combination as set forth in claim 1 wherein said semi-permeable wall has a porosity relative to the fluid flow in said vessel to feed a second fluid delivered from said vessel exterior into said inner chamber into the fluid flow in said vessel.

4. The combination as set forth in claim 1 wherein said semi-permeable wall consists of at least one layer of a material to impart a porosity for use in a microfiltration to ultrafiltration range.

5. The combination as set forth in claim 4 wherein said layer material is made of polysulphone and applied or impregnated into a support of laminated sintered mesh.

6. The combination as set forth in claim 1 wherein said element is secured to said vessel wall with said inner chamber in direct communication with said vessel exterior.

7. The combination as set forth in claim 1 which further comprises at least one tube between said element and said vessel exterior.

8. The combination as set forth in claim 1 wherein said element includes a pair of plates extending diametrically across said vessel and having parallel corrugations to define said inner chamber therebetween.

9. The combination as set forth in claim 8 comprising a plurality of said elements defining a module within said vessel.

10. The combination as set forth in claim 8 comprising a plurality of said elements, each said element being of plate-like cross-section and of corrugated shape defining a plurality of corrugations with said corrugations of one element being disposed transversely of the corrugations of an adjacent element.

11. The combination as set forth in claim 8 comprises a plurality of said elements, one group of said elements being corrugated and disposed in parallel and a second group of said elements being corrugated and disposed in parallel, said second group being coaxially and angularly disposed to said first group.

12. A filter element comprising
a pair of walls bounding a closed chamber of constant width therebetween, at least one of said walls being of a porosity to permit passage of a filtrate from a fluid flow over said at least one wall into said chamber, said walls being disposed in parallel relation and in being of undulating shape longitudinally thereof to define a turbulence generator for the fluid flow passing over said walls to generate turbulence within the fluid flow;
at least one support mesh supporting each said wall thereon; and
means in communication with said chamber to conduct the filtrate from the fluid flow out of said chamber.

13. A filter element as set forth in claim 12 wherein said walls are shaped to define a wavy shape.

14. A filter element as set forth in claim 12 wherein said porosity provides for filtration in a microfiltration to ultrafiltration range.

15. An element comprising
a pair of walls bounding a closed chamber of constant width therebetween, at least one of said walls being of a porosity relative to a fluid flow passing over said walls to pass a second fluid from said chamber into the fluid flow for mixing therewith, said walls being disposed in parallel relation and in being of undulating shape longitudinally thereof to define a turbulence generator for the fluid flow passing over said walls to generate turbulence within the fluid flow;
at least one support mesh supporting each said wall thereon; and
means in communication with said chamber to deliver the second fluid to said chamber.

16. An element as set forth in claim 15 wherein said porosity is in a microfiltration to ultrafiltration range.

17. In combination,
a vessel defining a flow path for conducting a fluid flow therethrough, said vessel having a wall for separating the fluid flow from the exterior of said vessel; and a plurality of helical elements disposed in said vessel in coaxial manner to define a turbulence generator for generating turbulence in the fluid flow, each said element having an inner chamber communicating with said exterior of said vessel through said vessel wall, a semi-permeable wall bounding said inner chamber at least in part and being permeable for a proportion of the fluid flow in said vessel for use in a micron, submicron or molecular range and a support mesh supporting said semi permeable wall thereon.

18. In combination,
a vessel defining a flow path for conducting a fluid flow therethrough, said vessel having a wall for separating the fluid flow from the exterior of said vessel; and
at least one element disposed in said vessel to define a turbulence generator for generating turbulence in the fluid flow, each element including a plurality of layers of contiguous tubes with each said tube having an inner chamber communicating with said exterior of said vessel through said vessel wall, a semi-permeable wall bounding said inner chamber at least in part and being permeable for a proportion of the fluid flow in said vessel for use in a micron, submicron or molecular range and a support mesh supporting said semi permeable wall thereon, said tubes in adjacent layers being disposed to cross one another with individual tubes having openings passing therethrough in sealed relation to said inner chamber thereof to pass the fluid flow.

19. In combination,
a vessel defining a flow path for conducting a fluid flow therethrough, said vessel having a wall for separating the fluid flow from the exterior of said vessel; and
a plurality of spaced parallel elements disposed in said vessel and having vanes extending therebetween in crossing relation to define a turbulence generator for generating turbulence in the fluid flow, each said element having an inner chamber communicating with said exterior of said vessel through said vessel wall, a semi permeable wall bounding said inner chamber at least in part and being permeable for a proportion of the fluid flow in said vessel for use in a micron, submicron or molecular range and a support mesh supporting said semi permeable wall thereon.

20. In combination,
a vessel defining a flow path for conducting a fluid flow therethrough, said vessel having a wall for separating the fluid flow from the exterior of said vessel; and
a plurality of parallel corrugated elements disposed in said vessel with corrugations thereof in crossing relation to each other to define a turbulence generator for generating turbulence in the fluid flow, each said corrugated element having an inner chamber of constant width communicating with said exterior of said vessel through said vessel wall, a semi-permeable wall bounding said inner chamber at least in part and being permeable for a proportion of the fluid flow in said vessel for use in a micron, submicron or molecular range and a support mesh supporting said semi permeable wall thereon.

* * * * *

UNITED STATES PATENT AND TRADEMARK OFFICE
CERTIFICATE OF CORRECTION

PATENT NO. : 4,902,418

DATED : February 20, 1990

INVENTOR(S) : Heinrich ziegler

It is certified that error appears in the above-identified patent and that said Letters Patent is hereby corrected as shown below:

Col. 5, line 49, "in situ" should be --_in situ_--

Signed and Sealed this

Fourth Day of June, 1991

*Attest:*

HARRY F. MANBECK, JR.

*Attesting Officer*     *Commissioner of Patents and Trademarks*